Figure 1:
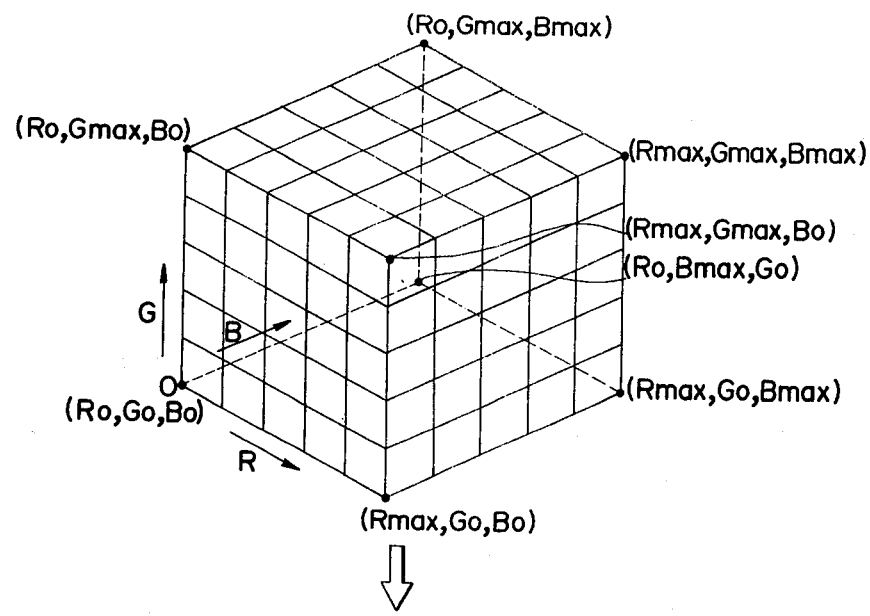
Figure 1:
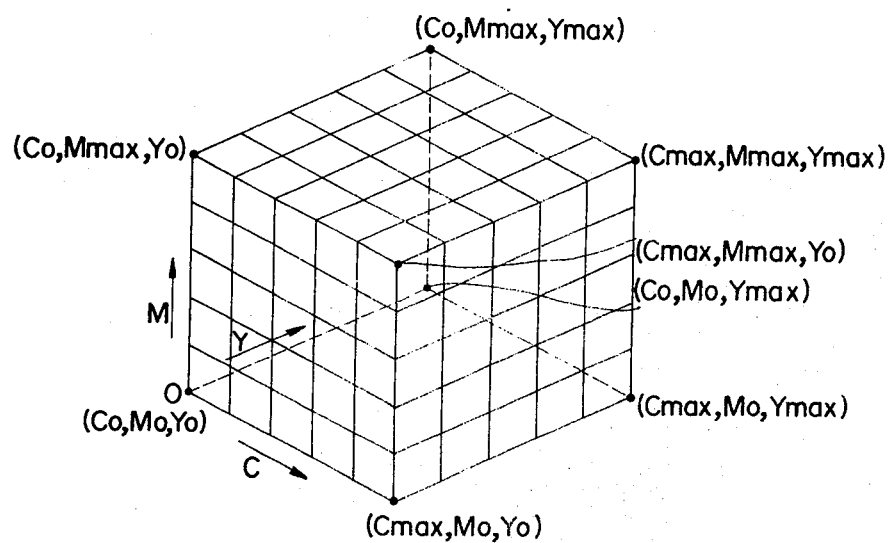

United States Patent [19]

Sakamoto

[11] 4,060,829
[45] Nov. 29, 1977

[54] METHOD OF COLOR CORRECTION

[75] Inventor: Takashi Sakamoto, Kyoto, Japan

[73] Assignee: Dainippon Screen Seizo Kabushiki-Kaisha, Kijamachi, Japan

[21] Appl. No.: 714,687

[22] Filed: Aug. 16, 1976

[30] Foreign Application Priority Data

Aug. 20, 1975 Japan .................. 50-100114

[51] Int. Cl.$^2$ .................................. G03F 3/08
[52] U.S. Cl. .................................. 358/80; 358/78
[58] Field of Search .................................. 358/80, 78

[56] References Cited

U.S. PATENT DOCUMENTS

| 3,600,505 | 8/1971 | Dobouney | 358/80 |
| 3,875,587 | 4/1975 | Pugsley | 358/80 |
| 3,942,154 | 3/1976 | Akami et al. | 358/78 X |

Primary Examiner—Howard W. Britton
Assistant Examiner—Mitchell Saffian
Attorney, Agent, or Firm—Holman & Stern

[57] ABSTRACT

A method of color correction of the particular application to a color scanner having a color correction circuit, an analog-digital converter and a memory. Color separation signals obtained by scanning a color original are first compressed to the color ranges reproducible by printing inks by the color correction circuit and then converted at the analog-digital converter to digital signals, which are to be utilized as addressing signals. Memorized in the memory are only correction signals whose absolute values are relatively small so as to effect a considerable reduction of a memory capacity of the memory. The correction signals are read out by the digital signals and added thereto, whereby suitably-corrected signals for recording color separation images can be obtained.

2 Claims, 7 Drawing Figures

METHOD OF COLOR CORRECTION

The present invention generally relates to a method of color correction in a plate-making process, and more particularly relates to a method of correcting color separation signals obtained from the spot-by-spot photoelectrical scanning of a color original.

To improve the accuracy of color reproductions, as is well known, for the past years there have been employed two alternative methods of color correction; handwork and photographic masking. Particularly, the latter method has been playing a significant part in producing multi-color plates. This method of color correction, however, has such disadvantages that, for instance, many skilled persons are required, its color correction ability is very much limited, its color separation result is not always uniform and further its process is very complicated.

Recently, an electronic color separator, generally called a "color scanner," has been put into practice for color separation as well as color correction to eliminate the disadvantages of the photographic masking method, and now it rather stands in a main currect in the relevant technical field. Most of color scanners now in wide use employ a computer of the analog rather than the digital type so as to facilitate speedy computations in color correction. This analog computer, however, is also known to have some disadvantages for all its capability of the speedy computations. For example, it lacks an ability of accomodating itself to a wide range of equations, and therefore operational amplifiers or other components would increase in number. Furthermore, the analog computer is less operative and more susceptible to external factors such as temperature and noise than the digital computer, in addition to its high manufacturing cost.

These disadvantages of the analog computer may be eliminated, at least theoretically, by replacing it with the digital computer. However, as mentioned before, a mere digitalization of the analog type circuit of the computer would cause a tremendous slow-down in the computing speed and would therefore be of no practical use.

Meanwhile, in a recent print-plate making industry, a so-called "direct scanner" has been proposed in order to comply with a demand for more beautiful and better quality of prints as well as to simplify and speed up operations. This direct scanner fulfills two functions, besides that of conventional color correction, of magnifying or reducing an image to a desired size and simultaneously producing a halftone negative or positive — this process is called a "halftone photography." These processes have conventionally been carried out separately by a print-making camera after producing color separation negatives by a color scanner, and a color correction by hand-retouching has been given to thus produced color separation negatives. On the other hand, since no step of color correction by hand-retouching is taken in this direct scanner, the color correction of the direct scanner must be performed as accurately as possible.

A recently-developed color correction method may be said to live up to a demand for more accurate color correction to a larger extent. This new method, so to speak, combines merits of both digital and analog computers; that is, it does not only have such merits of the digital as a high reliability, an ability of accomodating itself to a wide variety of color correction computations and a high operativity but also it has such a merit of the analog as an ability of high-speed disposition.

Primarily, the function of a color scanner is to photoelectrically scan a color original spot by spot to obtain color separation signals of each of three primary colors (red, green and blue, which will be referred to as "R", "G" and "B" hereinafter). These R, G and B color separation signals are then fed into a color correction circuit of the color scanner, where eventually calculated are the amounts of printing inks (cyan, magenta, yellow and black) required to reproduce a hue of a certain scanned spot on the color original. Hereinafter, such cyan, magenta, yellow and black inks will be referred to as "C", "M", "Y" and "K".

The above described new method of color correction achieves its aim by taking advantage of the fact that a combination of R.G.B color separation signals representative of a certain spot on the color original exactly corresponds to a combination of the amounts of C, M and Y inks required for reproducing a hue of the spot as a print (in this case, a black ink signal K is omitted for the purpose of simplifying the descriptions). In other words, the determination of the value of each color separation signal automatically determines the required amount of each ink. According to this color correction method, already-corrected C.M.Y combinations each of which corresponds to a R.G.B combination are previously stored in a memory so that the R.G.B combination obtained by scanning a color original is utilized as an addressing signal for reading out its corresponding C.M.Y. combination from the memory.

However, the disadvantage of this method is that, if human eyes can distinguish the density of each of three colors in 200 steps or so, the C.M.Y combinations to be memorized will reach around $200^3$ (=8,000,000). In order to read them out at a considerably high speed, a core memory or a semiconductive memory, which is very costly, would have to be installed. Though it is of course feasible to divide each color density to 16 steps (in this case, the total combinations will be $16^3$) so as to reduce its memory capacity, each density step becomes too rough and a density difference between the two steps is too big; which results in a quality deterioration of a finished product. A possible way to compensate for the roughness between the steps, namely, to prevent a deterioration of a print, is to supplement an intermediate value between the two density steps. Even by this way, however, it will turn out to be impossible to reduce the memory capacity of the memory to a sufficient level, since not only C.M.Y signals but also such compensating signals of the intermediate values have to be memorized, and, furthermore, each of C.M.Y signals needs to be further divided according to its color tone ranging from 0 to 100%.

A prime object of the present invention is therefore to provide a method of color correction which is of the particular application to a color scanner of the digital type and effects a considerable reduction of a memory capacity of a memory used in the color scanner.

According to the present invention, there is provided a method of color correction of the particular application to a color scanner wherein color separation density signals of each color obtained from photoelectrical scanning of a color original are suitably corrected to be used for recording color separation negatives, said method comprising;

providing a color correction circuit for compressing said color separation signals to color ranges reproducible by printing inks, an analog-digital converter for digitalizing said compressed color separation signals and a memory for memorizing correction signals which are able to compensate for differences between values of said digitalized signals and preestimated color separation density values of a finished print, utilizing said digitalized color separation signals as addressing signals for reading out said correction signals memorized in said memory, and adding said read-out correction signals to said digitalized color separation signals.

It is preferable that said correction signals to be memorized in said memory are differences between values of said digitalized color separation signals and END (equivalent neutral density) values.

Thus, it will be understood that a memory capacity of the memory can be considerably reduced because all what are memorized in the memory are only the above-mentioned differences whose absolute values are comparatively small.

Figure 2:
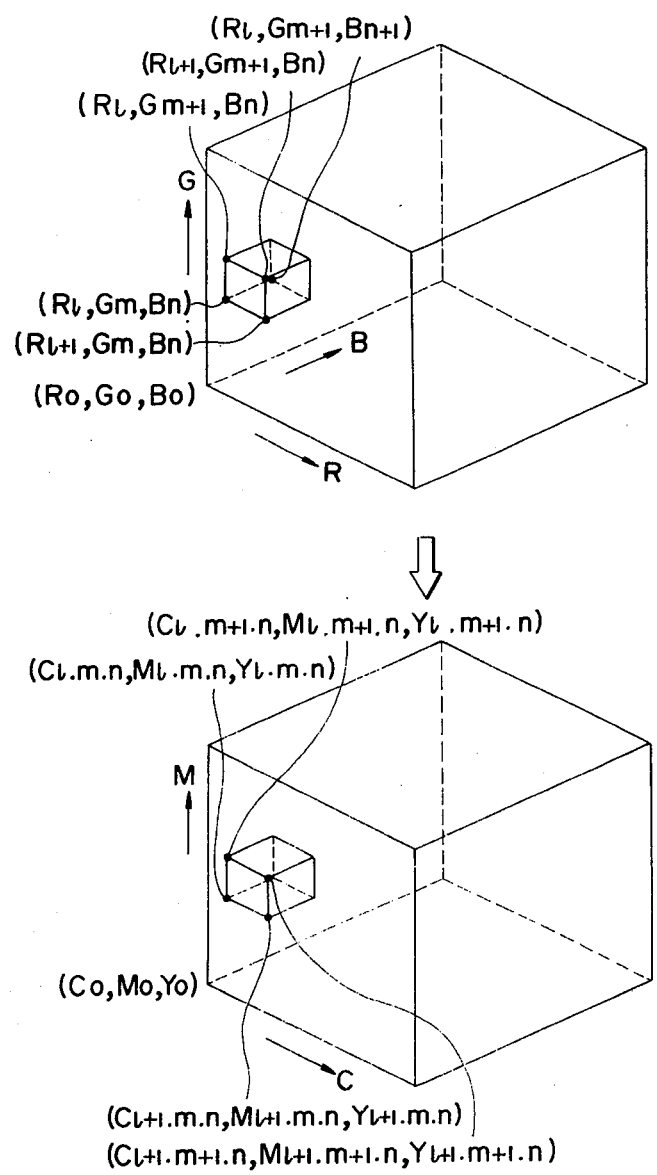
Figure 3:
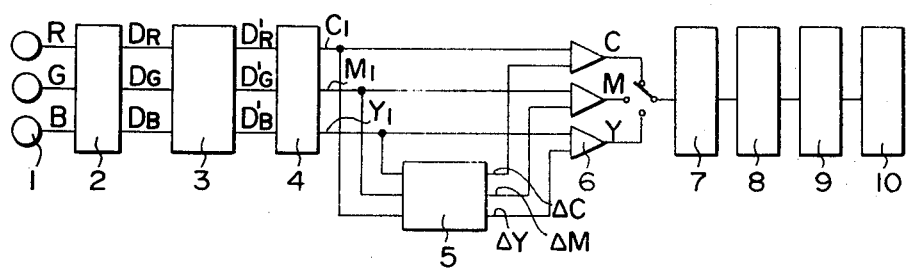
Figure 4:
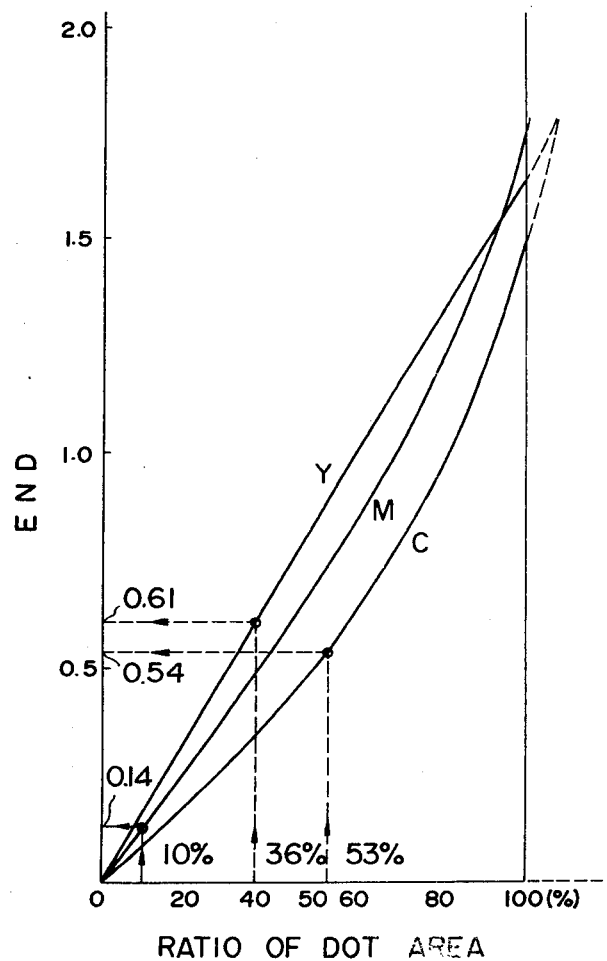
Figure 5:
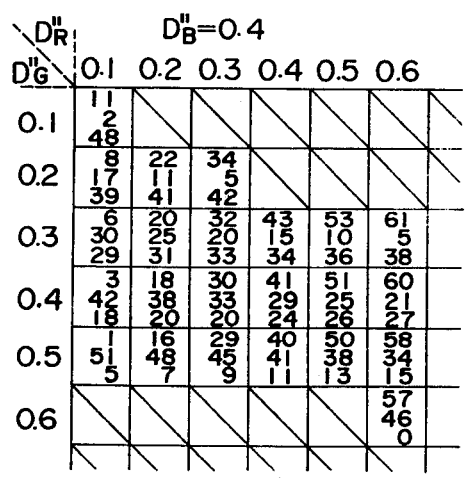
Figure 6:
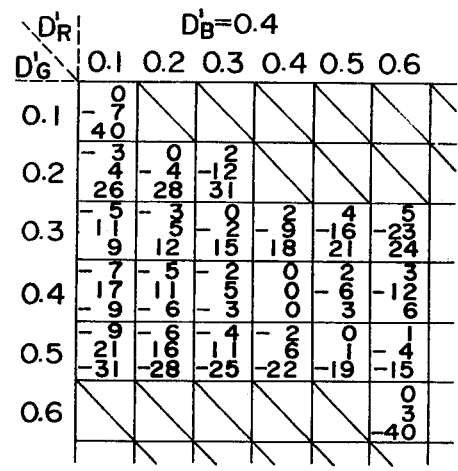
Figure 7:
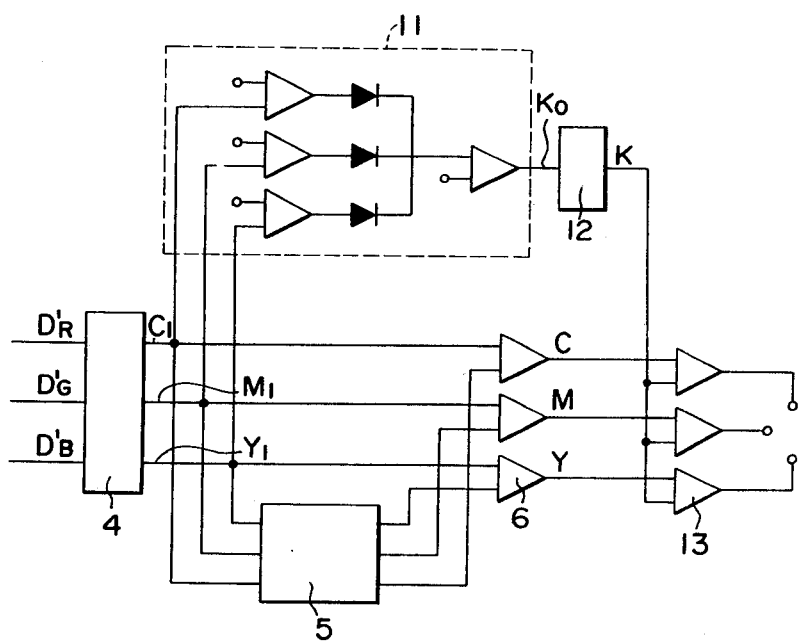

The present invention will now be described in detail, by way of example, with reference to the accompanying drawings, in which;

FIGS. 1 and 2 are schematic illustrations showing fundamentals of a color correction method by a color scanner, FIG. 3 is a block diagram showing one example of a color scanner to which a method of the invention is applied, FIG. 4 is a graphical illustration showing a relationship between a ratio of a halftone dot area and an END (equivalent neutral density) value, FIG. 5 is a table showing with what percentage of a dot area each of the C, M, and Y inks has to be printed in order to reproduce a color of certain R, G and B color separation densities, FIG. 6 is a table showing differences between END values and digitalized color separation density values, and FIG. 7 is a block diagram how to carry out an under color removal (UCR) process by a color scanner to which the method of the invention is applied.

Before going into the detail of the present invention, a brief description of what color correction is basically performed by a digital color scanner will be made with reference to FIG. 1. The upper graph in FIG. 1 indicates that any color on a color original may be reproduced by suitably overlapping three primary colors (red, green and blue) one upon the other, while the lower graph indicates that any color reproduced by R, G and B is also reproducible by three primary printing inks (cyan, magenta and yellow). In other words, a certain co-ordinate in the upper graph represented by R, G and B always corresponds to a certain co-ordinate in the lower graph represented by C, M and Y. Accordingly, the conversion of a R-G-B co-ordinate system to a C-M-Y co-ordinate system may be called color correction by a color scanner. The color scanner is provided with a memory for memorizing such C.M.Y combinations each of which corresponds to a R.G.B combination. This R.G.B combination serves as addressing signals for reading out its corresponding C.M.Y combination.

Though this method of color correction by a digital color scanner is more advantageous than the prior art in many respects, it does not succeed in eliminating a problem which is concerned with a reduction of the memory capacity of the memory. As has been referred to before, even if each color is divided to 16 steps according to its density in order to reduce the memory capacity, each density step becomes so rough that a compensating intermediate value between the two density steps has to be supplemented. For instance, as shown in FIG. 2 wherein a certain input value of R, G and B is in proportion to a certain output value of C, M and Y, where an input value ($R_l$, $G_m$, $B_n$) corresponds to an output value ($C_{l\cdot m\cdot n}$, $M_{l\cdot m\cdot n}$, $Y_{l\cdot m\cdot n}$) and another input value ($R_{l+1}$, $G_{m+1}$, $B_{n+1}$), which is one step above the input value ($R_l$, $G_m$, $B_n$), corresponds to an output value ($C_{l+1\cdot m+1\cdot n+1}$, $M_{l+1\cdot m+1\cdot n+1}$, $Y_{l+1\cdot m+1\cdot n+1}$), the intermediate output values corresponding to intermediate input values between such two input values can be obtained as follows:

when each of the intermediate input values is R, G or B, $R_l \leq R \leq R_{l+1}$, $G_m \leq G \leq G_{m+1}$, $B_n \leq B \leq B_{n+1}$, each of the intermediate output values is given by;

$$C = C_{l\cdot m\cdot n} + \left\{ \frac{R - R_l}{R_{l+1} - R_l} \times (C_{l+1\cdot m\cdot n} - C_{l\cdot m\cdot n}) \right\}$$

$$+ \left\{ \frac{G - G_m}{G_{m+1} - G_m} \times (C_{l\cdot m+1\cdot n} - C_{l\cdot m\cdot n}) \right\} +$$

$$\left\{ \frac{B - B_n}{B_{n+1} - B_n} \times (C_{l\cdot m\cdot n+1} - C_{l\cdot m\cdot n}) \right\}$$

$$= C_{l\cdot m\cdot n} + \Delta R_l \cdot \Delta C_{l+1\cdot m\cdot n} + \Delta G_m \cdot \Delta C_{l\cdot m+1\cdot n} +$$

$$\Delta B_n \cdot \Delta C_{l\cdot m\cdot n+1}$$

$$M = M_{l\cdot m\cdot n} + \left\{ \frac{G - G_m}{G_{m+1} - G_m} \times (M_{l\cdot m+1\cdot n} - M_{l\cdot m\cdot n}) \right\}$$

$$+ \left\{ \frac{B - B_n}{B_{n+1} - B_n} \times (M_{l\cdot m\cdot n+1} - M_{l\cdot m\cdot n}) \right\}$$

$$+ \left\{ \frac{R - R_l}{R_{l+1} - R_l} \times (M_{l+1\cdot m\cdot n} - M_{l\cdot m\cdot n}) \right\}$$

$$= M_{l\cdot m\cdot n} + \Delta G_m \cdot \Delta M_{l\cdot m+1\cdot n} + \Delta B_n \cdot \Delta M_{l\cdot m\cdot n+1} +$$

$$\Delta R_l \cdot \Delta M_{l+1\cdot m\cdot n}$$

$$Y = Y_{l\cdot m\cdot n} + \left\{ \frac{B - B_n}{B_{n+1} - B_n} \times (Y_{l\cdot m\cdot n+1} - Y_{l\cdot m\cdot n}) \right\}$$

$$+ \left\{ \frac{R - R_l}{R_{l+1} - R_l} \times (Y_{l+1\cdot m\cdot n} - Y_{l\cdot m\cdot n}) \right\}$$

$$+ \left\{ \frac{G - G_m}{G_{m+1} - G_m} \times (Y_{l\cdot m+1\cdot n} - Y_{l\cdot m\cdot n}) \right\}$$

$$= Y_{l\cdot m\cdot n} + \Delta B_n \cdot \Delta Y_{l\cdot m\cdot n+1} + \Delta R_l \cdot \Delta Y_{l+1\cdot m\cdot n} +$$

$$\Delta G_m \cdot \Delta Y_{l\cdot m+1\cdot n}$$

Thus, it will be understood that thus obtained intermediate output values corresponding to the intermediate input values may be made use of as compensating signals to make color separation negatives sufficiently smooth even if each density step is relatively rough. In this case, however, as mentioned before, signals in the memory to be read out by R, G and B addressing signals are not only already-corrected signals $C_{l\cdot m\cdot n}$, $M_{l\cdot m\cdot n}$ and $Y_{l\cdot m\cdot n}$ but also compensating signals $\Delta C(\Delta C_{l+1\cdot m\cdot n},$ $\Delta C_{l\cdot m+1\cdot n}, \Delta C_{l\cdot m\cdot n+1}), \Delta M(M_{l+1\cdot m\cdot n}, \Delta M_{l\cdot m+1\cdot n}, \Delta M_{l\cdot m\cdot n+1})$ and $\Delta Y(\Delta Y_{l+1\cdot m\cdot n}, \Delta Y_{l\cdot m+1\cdot n}, \Delta Y_{l\cdot m\cdot n+1})$, and moreover each of C, M and Y output signals needs to be further divided according to its color tone ranging from 0% to 100%. It is therefore impossible to reduce its memory capacity to a sufficient level.

FIG. 3 is a block diagram showing one example of a color scanner to which the color correction method of the present invention is applied.

Beams which have been divided into three R, G and B colors by the scanning operation are photoelectrically converted by each photocell 1 to electric color separation signals, which are further converted to color separation density signals $D_R$, $D_G$ and $D_B$ by logging circuits 2. These density signals are then fed into a color correction circuit 3 including compression circuits, where they are multiplied by a variable constant $k(<1)$ and are compressed to the color ranges reproducible by each ink to become color separation density signals $D_{R'}$, $D_{G'}$ and $D_{B'}$.

These signals $D_{R'}$, $D_{G'}$ and $D_{B'}$ suitably corrected at the color correction circuit 3 are then input to an analog-digital (A–D) converter 4, where they are converted to digital signals $C_1$, $M_1$ and $Y_1$. Each of the digitalized signals $C_1$, $M_1$ and $Y_1$, when each of the color separation density signals $D_{R'}$, $D_{G'}$ and $D_{B'}$ is exactly replaced by an equivalent neutral density (END), is numerically close to such an END value.

For example, assuming that the color separation signals $D_R$, $D_G$ and $D_B$ which have been obtained by scanning a color original and have values 1.05, 0.75 and 0.9 respectively are compressed to the color ranges reproducible by printing inks at the color correction circuit 3 in which a highlight set-up density and a compression rate have been prescribed to be 0.3 and 1/1.5 respectively, the resulting color separation signals $D_{R'}$, $D_{G'}$ and $D_{B'}$ are;

$$D_R' = \frac{1.05 - 0.3}{1.5} = 0.5, \quad D_G' = \frac{0.75 - 0.3}{1.5} = 0.3$$

$$D_B' = \frac{0.9 - 0.3}{1.5} = 0.4$$

These density signals $D_{R'}$, $D_{G'}$ and $D_{B'}$ are then converted to digital signals $C_1(=0.5)$, $M_1(=0.3)$ and $Y_1(=0.4)$ at the A–D converter 4.

FIG. 5 shows an exchange table between a color separation density of each color and a halftone dot area of each ink, indicating how much each of inks C, M and Y has to be overlapped one upon the other to obtain preestimated color separation densities $D_{R''}$, $D_{G''}$ and $D_{B''}$ of a finished print. From this table it will be understood that, if the preestimated color separation densities $D_{R''}$, $D_{G''}$ and $D_{B''}$ are equal to the values of color separation density signals $D_{R'}(=0.5)$, $D_{G'}(=0.3)$ and $D_{B'}(=0.4)$ suitably corrected at the color correction circuit 3, each of C, M and Y inks has to be printed with a 53%, 10% or 36% dot area respectively.

On the other hand, FIG. 4 shows a relationship between a halftone dot area of each ink and its END value. This term "END" is interpreted to imply a density of an achromatic color. For instance, when an achromatic color is produced by adding a suitable amount of magenta and yellow to cyan of a certain dot area, a density of the resulting achromatic color is called an "END value" of the cyan ink having that amount of dot area. Accordingly, if the dot areas of C, M and Y are 53%, 10% and 36%, FIG. 4 indicates that their respective END values are;

$$C = 0.54, M = 0.14 \; Y = 0.61$$

When compared with these END values, it may be said that digitalized signals $C_1(=0.5)$, $M_1(=0.3)$ and $Y_1(=0.4)$ output from the A–D converter 4 are relatively numerically close to the END values. In this case, it should be noted that the above-mentioned values have been predetermined under certain fixed conditions and may of course vary with the change of conditions.

The differences between the END values (C,M,Y) and digitalized density signals ($C_1$, $M_1$, $Y_1$) can be attributed to contamination inherent to color inks and effects of so-called proportionality failure and additivity failure. FIG. 6 is tabularly showing how much difference ($\Delta C$, $\Delta M$ and $\Delta Y$) there is between each END value (C, M and Y) and digitalized density signal ($C_1$, $M_1$ and $Y_1$) when each of the color separation density signals ($D_{R'}$, $D_{G'}$ and $D_{B'}$) has a certain value. This table shows that when $D_{R'}$, $D_{G'}$ and $D_{B'}$ are 0.5, 0.3 and 0.4 the differences $\Delta C(=C-C_1)$, $\Delta M(=M-M_1)$ and $\Delta Y(=Y-Y_1)$ will be 4, −16 and 21 respectively. Therefore, it will be understood that, by adding such differences to or subtracting them from the digitalized density signals $C_1$, $M_1$ and $Y_1$, it becomes possible to obtain signals which are free from effects of ink contamination, proportionality failure or additivity failure.

According to the present invention, there is provided a memory 5 as shown in FIG. 3 to memorize such differences $\Delta C$, $\Delta M$ and $\Delta Y$, while the digitalized density signals $C_1$, $M_1$ and $Y_1$ function as addressing signals for reading out those memorized differences. Therefore, it will readily be understood that all that should be memorized in the memory 5 are only END correction signals, namely, the above-mentioned differences $\Delta C$, $\Delta M$ and $\Delta Y$ whose absolute values are comparatively so small that not so many bits are required to represent them. This advantage lends itself to a considerable reduction of the contents to be memorized. When compared with the method of the invention, the prior methods have to employ a memory of larger capacity since a great number of combinations of already-corrected C, M and Y signals and sometimes intermediate signals for making up for such C, M and Y signals have to be memorized in a memory.

Another advantage expected by limiting the memory contents to only END correction signals is that the contents can be further reduced when color separation density signals $D_{R'}$, $D_{G'}$ and $D_{B'}$ are all equal. For instance, as shown in FIG. 6, when all of those color separation density signals are equal to 0.4, their END correction values are zero.

Thus memorized END correction signals are read out by the digitalized density signals $C_1$, $M_1$ and $Y_1$ and are added thereto at adders 6 to become corrected signals $C(=C_1 + \Delta C)$, $M(=M_1 + \Delta M)$ and $Y(=Y_1 + \Delta Y)$ which are free from effects by ink contamination and others.

In the case of digitalizing density signals $D_{R'}$, $D_{G'}$ and $D_{B'}$ to $C_1$, $M_1$ and $Y_1$, it is preferable to divide the latter signals to, for example, 128 or 256 steps at least more than distinguishable by human eyes, and to further categorize the 128 or 256 steps in eight or 16 steps by utilizing upward digits of the digitalized density signals. These categorized steps are to be utilized as addressing signals for reading out the contents in the memory 5 and the roughness between the two categorized steps can therefore be easily compensated for by supplementing intermediate values therebetween, whereby recording signals C, M and Y are sufficiently smoothed out.

Though the descriptions thus far made have not referred to a method of obtaining signals for recording a black printer for the purpose of simplifying the descriptions, one of such methods, which will be most suitable for the color correction of the present invention, will now be referred to. According to the invention, it is preferable to use such a minimum value selection circuit 11 as shown in FIG. 7 for picking up black printer signal $K_0$ from the above-described digitalized density signals $C_1$, $M_1$ and $Y_1$ so that the color correction method of the invention enables a following "under color removal" (UCR) process to be more easily carried out.

That is, black printer signals $K_0$ generated from the circuit 11 are adjusted at a black printer signal adjuster 12 to black printer signals of desired value, and are then added to or subtracted from the suitably corrected recording signals C, M and Y by means of adders 13. This means that a black printer signal K of a certain magnitude corresponding to an END value is added to or subtracted from each of the recording signals represented by END values. Therefore, even if the UCR process is carried out, grey portions on an original are also reproduced as grey and colored portions are also reproduced with the same hue, though different in their luminance.

Furthermore, when a black printer is overlapped upon each of cyan, magenta and yellow printers, the luminance is almost completely adjusted so that the same color as that before performing the UCR process can be reproduced. In this way, more accurate UCR process is made possible by use of END signals since a color balance is automatically achieved.

The recording signals $C(=C_1 + \Delta C)$, $M(=M_1 + \Delta M)$ and $Y(=Y_1 + \Delta Y)$ are then converted to analog signals at a digital-analog converter 7. Thereafter, they pass through a tone-correction circuit 8 and are fed into an anti-logging circuit 9, where generated are signals for driving a driving circuit 10 for exposure beams which produce color separation negatives of each color.

Although the contents to be memorized in the memory 5 are preferably END correction signals $\Delta C$, $\Delta M$ and $\Delta Y$, it should be understood that it is not necessary to limit the contents to END correction signals. Other kinds of signals may be usable, so long as they are capable of making the color separation density values $D_{R'}$, $D_{G'}$ and $D_{B'}$ equal to preestimated color separation densities $D_{R''}$, $D_{G''}$ and $D_{B''}$ of a finished print.

What we claim is:

1. A method of color correction of the particular application to a color scanner which is adapted to produce color separation negatives of each color by utilizing color separation density signals obtained from the photoelectrical scanning of a color original and includes a color correction circuit, an analog-digital converter and a memory, said method of color correction comprising the steps of:
   storing in said memory correction signals each adapted to correct a difference between a signal value digitally converted from each of said color separation density signals and a signal value corresponding to a color separation density which a finished print should have;
   utilizing said color separation density signals, which have already been compressed to a color range reproducible by printing inks at said color correction circuit and converted to digital signals by said analog-digital converter, as addressing signals for reading out said correction signals from said memory; and
   adding said read-out correction signals to said digital color separation density signals, thereby obtaining recording signals adapted to produce color separation negatives of each color.

2. A method according to claim 1, wherein each of said correction signals to be stored in said memory is a difference between a signal value digitally-converted from each of said color separation density signals and a signal value which is obtained by exactly replacing each of said color separation density value of the finished print by an END (equivalent neutral density) value.

* * * * *